(12) United States Patent
Duchassin et al.

(10) Patent No.: US 8,864,383 B2
(45) Date of Patent: Oct. 21, 2014

(54) AXLE BOX FOR A RAILWAY VEHICLE

(75) Inventors: Arnaud Duchassin, Monts (FR); Thierry Le Moigne, Luynes (FR)

(73) Assignee: Aktiebolaget SKF, Gothenburg (SE)

( * ) Notice: Subject to any disclaimer, the term of this patent is extended or adjusted under 35 U.S.C. 154(b) by 13 days.

(21) Appl. No.: 13/570,744

(22) Filed: Aug. 9, 2012

(65) Prior Publication Data

US 2013/0207410 A1 Aug. 15, 2013

(30) Foreign Application Priority Data

Aug. 9, 2011 (EP) .................................. 11306024

(51) Int. Cl.
*B61F 15/12* (2006.01)
*B61F 15/26* (2006.01)

(52) U.S. Cl.
CPC ................. *B61F 15/26* (2013.01); *B61F 15/12* (2013.01)
USPC ...................................... 384/459; 105/218.1

(58) Field of Classification Search
USPC ............... 105/218.1; 295/42.1, 42.2; 384/459
See application file for complete search history.

(56) References Cited

U.S. PATENT DOCUMENTS

| 3,888,187 A | 6/1975 | Van Moss, Jr. |
| 8,109,674 B2 * | 2/2012 | Hubbard ........................ 384/143 |
| 2008/0085069 A1 | 4/2008 | Toth et al. |

FOREIGN PATENT DOCUMENTS

| EP | 2246581 A1 | 11/2010 |
| JP | 57091662 U | 6/1982 |
| JP | 2004251321 A | 9/2004 |

* cited by examiner

*Primary Examiner* — Zachary Kuhfuss
(74) *Attorney, Agent, or Firm* — Bryan Peckjian; SKF USA Inc. Patent Department

(57) ABSTRACT

An axle box for a railway vehicle bogie comprises a rolling bearing having an outer ring element, an inner ring element, rolling elements mounted there between, and a seal element, the inner ring element being adapted to be secured by screw bolts to an axial end of bogie axle. The axle box comprises an end cap comprising a flange with an inner face and an outer face, an annular first radial surface portion of the inner face being so defined that it is able to lean against an axial end of the inner bearing ring element of the rolling bearing. The flange comprises a central part traversed by screw bores. The flange comprises a first inner axial ridge running alongside the outer circumference of the cap, and extending axially towards the rolling bearing all around the flange, further than the first radial surface portion.

12 Claims, 2 Drawing Sheets

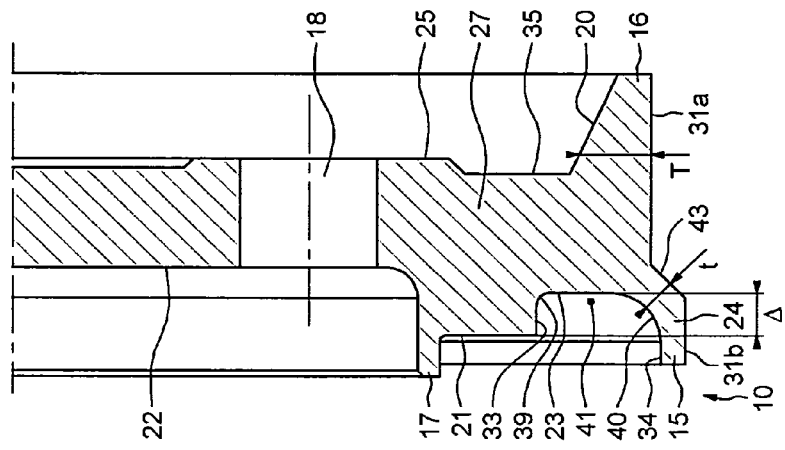
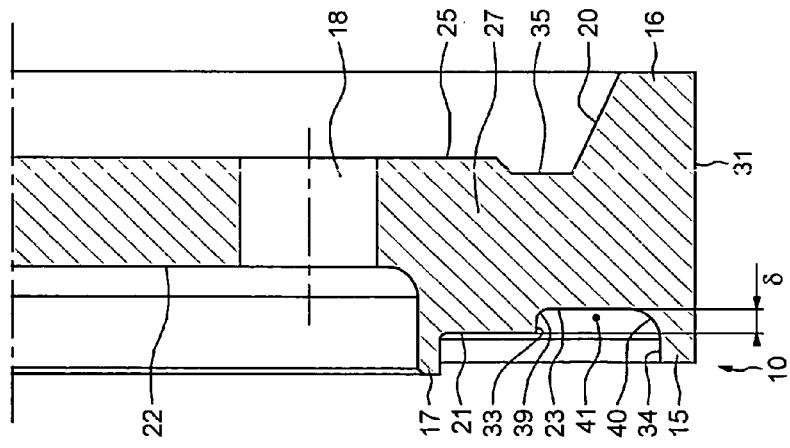

AXLE BOX FOR A RAILWAY VEHICLE

FIELD OF THE INVENTION

The present invention relates to an axle box of a railway bogie, specially the so-called Y25 bogie, of widespread use throughout Europe, and in particular to the safety supervision of the bogie.

BACKGROUND OF THE INVENTION

Along railway trucks, detection boxes emit beams of infrared light directed to the extremities of the axles of the bogies, more or less in the region of the rolling bearing of the axle box, in order to detect abnormal temperatures of this region, caused by friction in damaged bearings.

The rolling bearings of a bogie may be maintained on the axle by an end cap screwed to the axle. They are then, in addition protected by a closed lid covering both the end cap, and the seal region of the bearing. In such a closed axle box, the end cap is secured by screws to the axle and contacts the inner bearing ring, whereas the external lid is assembled to a core part of the axle box and contacts the outer bearing ring. In this way, the temperature of the lid is a consequence of the temperature of the outer bearing ring.

In other embodiments, simplified open axle boxes have been developed, in which the end cap and lid are replaced by an extended end cap covering the inner ring of the rolling bearing and also covering part of the seal of the rolling bearing. Bogies with such simplified axle boxes are prone to erroneous failure detection by the infrared hotbox detectors.

Critical temperatures may be wrongly detected on such a simplified axle box, even if the rolling bearing is in good working order. As a matter of fact, high temperatures of external seals of the axle box may be measured or high temperatures of screw bolts holding the end cap. Both temperatures are usually higher than the temperature of the rings of the roller bearing, which are actually the temperatures to be surveyed.

The present invention aims at proposing an end cap for a simplified axle box, which can be used without an external lid, and which can be subjected to infrared temperature detection with at least the same accuracy detection, as when the infrared beams are directed towards the lid of a closed axle box.

SUMMARY OF THE INVENTION

To this purpose, an end cap adapted for being screwed to a railway bogie axle, comprises a flange with an inner face and an outer face, an annular first radial surface portion of the inner face being so defined that it is able to lean against an axial end of an inner bearing ring of a bogie. A central part of the flange, circled by the annular surface, is traversed by screw bores. The flange comprises an inner axial ridge running alongside the outer circumference of the cap, and extending all around the flange, axially further than the first surface.

Preferably, the annular surface traversed by screw bores is limited by an inner second radial surface portion that is axially set back from—more distant from the bearing ring than—the first annular surface, and the flange comprises a rim part around the first annular surface comprising itself a third radial surface portion on the inner face of the flange, the third radial surface portion being also set back axially from the first annular surface, so as to face without contact, when assembled, at least part of a bearing seal of the rolling bearing.

The rim part then comprises an inner axial ridge running alongside the outer circumference of the flange, and extending from the third surface, all around the flange, axially to at least as far as the first surface, and preferably extending further than the first surface.

In another aspect, an axle box for a railway vehicle bogie comprises a rolling bearing having an outer ring element, an inner ring element, rolling elements mounted there between, and a seal element, the inner ring element being adapted to be secured by screw bolts to an axial end of bogie axle. The axle box comprises an end cap comprising a flange with an inner face and an outer face, an annular first radial surface portion of the inner face being so defined that it is able to lean against an axial end of the inner bearing ring element of the rolling bearing. The flange comprises a central part traversed by screw bores. The flange comprises a first inner axial ridge running alongside the outer circumference of the cap, and extending axially towards the rolling bearing all around the flange, further than the first radial surface portion.

In a preferred embodiment, the end cap comprises an outer annular axial ridge, running circumferentially round the screw bores, and extending axially opposite to the inner ridge, away from the rolling bearing, further than axial ends of the bores. Preferably, the outer annular axial ridge extends axially further than the heads of the screw bolts.

In a preferred embodiment, the central part of the flange comprises on its inner face, a second radial surface portion that is axially set back from the first axial surface i.e. more distant from the bearing ring than the first axial surface and in which the first radial surface portion is continued towards the periphery of the flange by a third inner radial surface portion also set back axially from the first radial annular surface, the first inner ridge protruding axially from the periphery of the third radial surface portion. In other words, the central part of the flange comprises on its inner face a second radial surface portion facing the axle, placed so as to leave an axial gap between the second radial surface portion and an end surface of the axle, and comprising a third radial surface portion of the inner face at least partly facing, and not contacting, the seal of the rolling bearing, the inner axial ridge protruding axially from the periphery of the third radial surface portion.

In one embodiment, the inner and outer ridges are limited radially by a common axial surface.

In another embodiment, the inner ridge extends radially further than the outer ridge.

Advantageously, the outer ridge is limited by a cylindrical surface on its external circumference, and is limited by a frustoconical surface on its internal circumference.

Advantageously, the inner ridge is cup shaped, and comprises an inside surface generated by an arc of circle tangent to the third inner radial surface portion. The inner ridge is preferably limited by an outer concave rim of even thickness.

In a preferred embodiment, the end cap comprises a second inner ridge running along the inner circumference of the first radial surface portion. In a favourite embodiment, the second inner ridge has an inner circumference with a diameter equal to the outer diameter of an axial end of the axle.

In a preferred embodiment, the central part of the flange comprises an outer surface comprising a base surface and comprises flat regions surrounding the screw bores and protruding from the base surface.

The axial gap between the first inner ridge and the outer bearing ring of the rolling bearing is preferably less than or equal to 5 mm, and preferably less than or equal to 2 mm. The gap is here intended as the maximum axial distance between the first inner ridge and the outer bearing ring.

Advantageously the second inner ridge is inserted between the axle and the inner bearing ring, into a circumferential groove of the ring.

Additional objects, advantages and other features of this invention shall be set forth in the description that follows.

BRIEF DESCRIPTION OF THE DRAWINGS

Examples of non limiting forms of embodiment will now be described, with reference to the attached drawings, wherein:

FIG. 2 is a cross section of an end cap of the axle box of FIG. 1, and

FIG. 3 is a cross section view of another embodiment of end cap according to the invention.

DETAILED DESCRIPTION OF THE INVENTION

Figure 1:
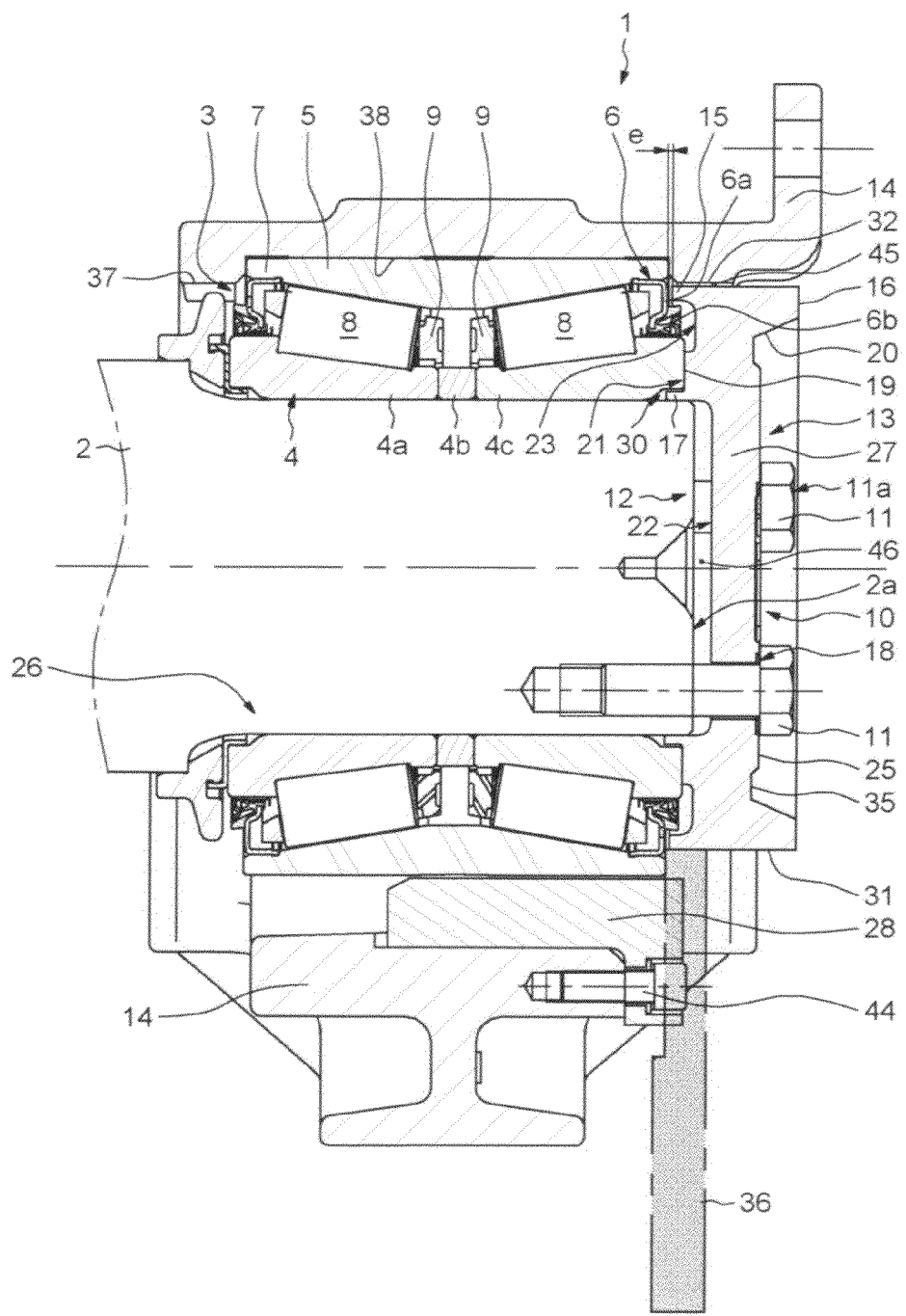
FIG. 1 is a cross section view of an axle box according to the invention.

In the present description, axial surfaces mean surfaces generated by axial straight lines, thus comprising these axial straight lines; radial surface portions mean surfaces generated by radial straight lines, and more precisely, surfaces perpendicular to the axis of the bearings of the axle box, or perpendicular to the axis of the end cap.

As can be seen on FIG. 1, an axle box 1 comprises a core part 14, with a central bore defining a horizontal axle passage 26, a rolling bearing 3 inserted in the axle passage 26, a spacer 28 inserted between the rolling bearing and a wall of the axle passage 26, and an end cap 10, screwed to an end of an axle 2 inserted in the rolling bearing 3. The rolling bearing 3 comprises an outer ring element 5, an inner ring element 4, and rolling elements 8 maintained by a cage element 9. The rolling bearing 3 also comprises an outer seal 6 oriented outwards from the axle 2, and an inner seal 7 oriented towards the opposite end of the axle 2. In the embodiment illustrated on FIG. 1, the outer ring element is a single part, whereas the inner ring assembly 4 is constituted of three separate ring elements 4a, 4b, 4c placed side by side. Ring elements 4a and 4c each support a line of frustoconical rolling elements 8, each cage being maintained by a separate cage element 9. The ring element 4b is placed as a spacer between rings 4a and 4c. The outer axial end 19 of inner bearing ring element 4c is in contact with the end cap 10 along a first radial surface portion 21. The outer ring 5 is axially shorter than the inner ring assembly 4. The outer seal 6 comprises an outer seal element 6a attached to the outer ring 9, and an inner seal element 6b attached to the inner ring element 4c. The outer seal element 6a and the inner seal element 6b are roughly aligned, respectively with the axial ends of outer ring 5 and of inner ring element 4c. The inner seal element 6b thus protrudes axially from the outer seal element 6a. The inner seal 7 is identical to the outer seal 6.

The axle passage 26 is radially wider than the outer diameter of the outer ring 5. It comprises a cylindrical portion 38, the diameter and axial length of which correspond to the diameter and axial length of the outer bearing ring 5, and in which the outer bearing ring can be inserted. The cylindrical portion 38 is limited on both axial ends by annular portions 32 and 37, whose diameter is less than the diameter of the outer ring 5. A spacer 28 is inserted between the outer ring and a wall of the axle passage facing the cylindrical portion 38. The spacer 28 is held by a screw bolt 44 inserted through the spacer 28 and penetrating axially into the core part 14. The spacer 28 protrudes axially both from the outer bearing ring, and from the core part 14. On its side supported by the spacer, the outer ring 5 protrudes axially from the core part 14.

Infrared beams 36 from detection boxes are usually directed in a vertical plane parallel to the rails, an inclined relative to the horizontal direction.

Due to the previously described positioning of inner ring assembly 4, outer ring 5, spacer 28 and core part 14, before then end cap 10 is screwed to the axle front end, such an infrared beam could reach the inner seal element 6b.

The end cap 10 comprises a radial flange 27, the diameter of which is such that the flange 27 reaches radially out to the annular portion 32, leaving only a gap 45 sufficient for avoiding friction between the end cap 10 and the annular portion 32.

The end cap 10 is screwed to a front end surface 2a of the axle 2 by screw bolts 11 running through screw bores 18, for instance by hexagonal screw bolts 11. The end of the screw bolts are provided with screw threads cooperating with corresponding threads provided in the axle 2. Outer ends of the screw bolts are fitted with protruding heads 11a, which may, for example, be flat heads of hexagonal shape.

The end cap 10 comprises an inner face 12 facing the roller bearing, and an outer face 13 oriented in the opposite direction. The end cap 10 is in contact with the inner bearing ring 4 along a first radial annular surface 21. The first annular radial surface portion 21 surrounds a second radial surface portion 22 of the inner face 12.

The second radial surface portion 22 is axially set back from the first radial surface portion—that is the second radial surface portion is axially further from the inner bearing ring assembly 4 then the first annular radial surface portion 21—, and is sufficiently set back so that an axial gap remains between the front end surface 2a of the axle 2, and the second radial surface portion 22. The first radial surface portion 21 is itself surrounded by a third radial surface portion 23, which is also set back from the first radial surface portion, so as to leave an axial gap between the third radial surface portion and the seal 6.

Consequently, heat transfer between the inner ring 4 and the end cap 10 is enhanced by enabling direct heat conduction between the inner ring 4 and the first radial surface portion 21. Heat transfer is hindered between the axle 2 and end cap 10, and between seal 6 and end cap 10. Thus, the temperature of end cap 10 is mainly imparted by the temperature of inner ring element 4c.

A first inner ridge 15 runs around the third radial surface portion 23 and points out axially towards the seal 6. A small gap "e" is left between the first inner ridge and the seal 6. This gap is sufficient to avoid friction between the seal and the first inner ridge, but is limited so as to avoid a direct reading of the temperature of the seal by an infrared beam penetrating between the inner rim and the outer bearing ring. This gap can be for instance comprised between 0.5 mm and 3 mm.

To completely avoid such a direct reading of the temperature of the seal 6, the axial length of the outer ring 5 may be chosen such that there is an axial overlay between the outer ring and the first inner ridge 15.

On its outer face 13, the end cap 10 comprises an outer axial ridge 16 running all around the external circumference of the outer face 13.

This outer ridge 16 extends axially away from the axle 2.

The first inner ridge 15 and the outer ridge 16 are limited by a common cylindrical surface 31 on which the temperature of the end cap may be read by infrared beams 44 oriented in a vertical plane.

The axial length of the outer ridge 16 is such that this outer ridge extends axially further and the axial end of the head 11a of the screws bolts 11. In this way, a direct reading of temperature on the head 11a of the screw bolts is avoided.

Between the first radial surface portion 21 and the second radial surface portion 22, a second inner ridge 17 points out of the inner face 12.

This second inner ridge 17 is limited by two cylindrical surfaces and is inserted between the axle 2 and a cylindrical surface of a circumferential groove of the inner bearing ring 4.

In this way, the first, second and third radial surface portions are precisely centered relative to the axle 2.

On the outer face 13 of the end cap, the screws bores 18 are surrounded by flat surface portions 25, on which the base of the heads of the screws can be propped against. These flat regions 25 are surrounded by a recess portion 35 of the outer face 13. In this way, washers can be installed under the base of the screw heads, the diameter of the washers being slightly larger than the diameter of the flat region 25, so that a tool can be inserted under the washer to lock or unlock the washer.

The temperature of the seal is usually noticeably higher than the temperature of the bearing rings. By encapsulating the outer seal behind the third radial surface portion 23 and behind the first inner ridge 15, a reading of the temperature of the end cap is promoted, instead of a reading of the temperature of the seal, and limits the likelihood that a temperature alarm will be triggered by a high temperature of the seal 6. The temperature of the end cap 10 is itself imparted by the temperature of the inner bearing ring element 4c, as already mentioned, so that it is a good indicator of a possible damage in the rolling bearing 3.

The geometry of the first inner ridge 15 and of the outer ridge 16 is such that heat transfer is enhanced between the first radial surface portion 21 contacting the inner bearing ring, and the outer common cylindrical surface 31 of the end cap 10: among other features, the outer ridge is limited by a frustoconical surface 20, the generating lines of the frustoconical surface intercepting the first radial surface portion 21.

Owing to the specific shape of the outer seal 6, with first seal element 6a being axially set back from the axial end of inner ring element 4c, the axial end of the first inner ridge 15 extends axially further than the axial position of the first radial surface portion 21.

An axle box according to the invention could also include a seal without a recess portion on the external periphery of the seal, and/or include an outer bearing ring extending axially as far, or further than, the inner bearing ring. In such an embodiment, the first radial surface portion could be surrounded by a third radial surface portion set back axially from the first radial surface portion as already described, and the first inner ridge could point axially no further or just as far, as an axial position of the first radial surface portion.

FIG. 2 is a radial section of the end cap 10 of FIG. 1, with same elements designated by same references.

The third radial surface portion 23 is limited on its inner diameter, as well as on its outer diameter, by portions of toroidal surfaces 39, 40 which are tangent to the third surface 23.

The toroidal surfaces 39, 40 are also at a tangent respectively to axial surfaces 33 and 34. The third radial surface portion 23, toroidal surfaces 39, 40 and axial surfaces 33 and 34 define a hollow volume 41, whose axial lateral limits 33 and 34 help to minimize the heat exchanges between the seal 6 and the end cap 10.

FIG. 3 is a section of another embodiment of an end cap according to the invention. Common elements are designated with same references as on FIGS. 1 and 2.

In this embodiment, the outer ridge 16 extends radially less than the inner ridge 15, and the radial thickness of both ridges is reduced compared to the embodiment of FIG. 2.

In this way, the outer circumference of the end cap 10 is less massive and can more easily reach a temperature which is close to the temperature of the inner bearing ring.

The radial position of axial surfaces 33 and 34 remains roughly the same as in the embodiment of FIG. 2, but the axial gap between the first radial surface portion 21 and the third radial surface portion 23 is more pronounced so as to define a larger hollow volume 41 between the seal 6 and the end cap 10.

In the embodiment of FIG. 2, the axial gap $\delta$ between the first and the third radial surface portions can be in the range of 3 to 5 millimeters, whereas in the embodiment of FIG. 3, the axial gap $\Delta$ between the first and the third radial surface portions may be in the range of 5 to 8 mm.

In the embodiment of FIG. 3, the radius of the toroidal portion 40 running at the base of the first inner ridge is larger than the radius of the toroidal portion 39 running at the border between first radial surface portion 21 and third radial surface portion 23. The radius of a toroidal portion means here the radius of the circle generating the torus, not the mean diameter of the torus.

Typically, the radius of outer toroidal portion 40 may be of about 8 millimeters and the radius of inner toroidal portion 39 may be of about 2 millimeters.

In this way, heat transfer from the seal 6 to the end cap 10 is hindered and heat transfer from the inner bearing ring element 4c to the peripheral surfaces 31 of the end cap 10 is promoted.

In both embodiments illustrated on FIGS. 1 and 2, the maximum radial thickness of the first inner ridge 15 is less than the maximum radial thickness of the outer ridge 16. This is partly due to the fact that the inner ridge 15 is limited, on its inner circumference, by the radial extent of the inner seal element 6b, and, on its outer circumference, by the inner diameter of the annular portion 32. It is also due to the fact that the outer ridge 16 must be of sufficient volume to offer a favourable heat transfer path from the inner bearing ring element 4c to the outside axial surface 31.

The axle box illustrated on FIG. 1 is limited axially by an axial surface 31 common to the first inner ridge 15 and to the outer ridge 16.

The axle box illustrated FIG. 2 is limited axially by a sequence of axial surfaces 31a, 31b limiting the outer ridge 16 and the first inner ridge 15, and of one frustoconical surface 43 joining the two axial surfaces 31a, 31b. More generally, the outer peripheral surface of the axle box can be constructed as a succession of one axial surface, followed by other axial and/or frustoconical surfaces, the generating lines of the frustoconical surfaces converging away from the axle 2. In this way, the outer peripheral surface 31 has a good ability for reflecting infrared beams received either in a vertical plane, or emitted at an angle from outside the railway track.

To assess the radial thickness "t" of the inner ridge, one can for example measure a thickness of the ridge perpendicular to the toroidal portion or perpendicular to the axial portion 43 of the inner ridge.

A radial thickness "T" of the outer ridge may also be defined, for instance by measuring the thickness perpendicularly to an external axial surface 31a of the outer ridge.

Still, in other embodiments, the outer ridge 16 could have substantially the same maximum thickness as the maximum thickness of the inner ridge 15.

The invention is not limited to the embodiments described and illustrated above, which are to be regarded as mere examples of a wider range of embodiments. For instance, the outer ridge 16 could be limited towards the centre of the flange by a surface which is not frustoconical, for instance limited by a surface generated by the revolution of a curved line. The outer ridge, instead of running along the outer circumference of the end cap, could be located radially closer to, or could be facing the first radial surface portion, so as to benefit from a better heat transfer from the inner bearing ring.

In an alternate embodiment of the invention, the annular portion 32 could have an inner diameter larger than the inner diameter of the outer bearing ring 5, in which case the axial end of the first inner ridge 15 could face at least part of the outer bearing ring 5.

An axle box according to the invention is still possible without the second inner ridge 17, the centering of the end cap being determined only by the position of the screw bores 18.

An axle box according to the invention is still possible without flat regions 35 around the screw bores.

In embodiments where relative axial positions of the outer face of the inner bearing ring, of the seal 6, and of the axial end of axle, are different from the embodiment described, first, second and third radial surface portion of an end cap according to the invention could be all aligned, or at least one of the second and third surfaces could be in continuity with the first radial surface portion.

The end cap according to the invention improves the rate of detection of excessive temperatures of the inner bearing ring which, alternatively to the temperature of the outer bearing, is a good indicator of a wrong functioning of the rolling bearing. The end cap according to the invention also reduces the number of erroneous failure detections caused by a high temperature of the seals of the rolling bearing.

When a detector infrared emits an infrared beam oriented in a vertical plan, the extended amount of axial areas visible by the beam, facilitates the temperature infrared detection. Actually, the extent of these areas is similar to the extent of axial areas of an external lid of a closed type axle box. The end cap prevents the infrared from reading the temperature of the screws, which screw temperature can also be a cause for erroneous detections.

The end cap according to the invention improves the security of safety detections, and can be assembled on existing geometries of axle boxes.

The invention claimed is:

1. An axle box for a railway vehicle bogie having a rolling bearing providing an outer ring element, an inner ring element, rolling elements mounted therebetween such that the inner ring element supports at least one of the rolling elements thereon to allow rolling contact therebetween, and a seal element, the seal element directly contacting the inner ring element, the inner ring element being adapted to be secured by screw bolts to an axial end of bogie axle, the axle box comprising:
an end cap having a flange with an inner face and an outer face,
a first annular radial surface portion of the inner face being so defined that the first annular radial surface portion is able to lean against and directly contact an axial end of the inner ring element of the rolling bearing to enable direct heat conduction between the inner ring element that supports the at least one of the rolling elements thereon and the end cap, the inner ring element having an outer axially extending surface oriented to face the outer ring element wherein
the end cap does not contact the seal element and does not contact the outer axially extending radial surface of the inner ring element,
the flange provides a central part traversed by screw bores, wherein
the flange has a first inner annular axial ridge running alongside the outer circumference of the cap, extending towards the rolling bearing all around the flange, axially at least as far as the first radial surface portion extends, so as to leave an axial gap between the first inner axial ridge and the outer seal bearing ring of the rolling bearing, the gap is less than or equal to 5 mm.

2. The axle box according to claim 1, wherein the end cap comprises an outer annular axial ridge, that extends circumferentially around the screw bores, and extending axially away from the rolling bearing, axially further than the heads of the screw bolts.

3. The axle box according to claim 2, wherein the first inner annular axial ridge and the outer annular axial ridge are limited radially by a common axial annular surface.

4. The axle box according to claim 2, wherein the first inner annular axial ridge extends radially further than the outer annular axial ridge.

5. The axle box according to claim 1, wherein the central part of the flange comprises on the inner face a second radial surface portion facing the axle, placed so as to leave an axial gap between the second radial surface portion and an end surface of the axle, and wherein the flange comprises a third annular radial surface portion of the inner face at least partly facing, and not contacting, the seal of the rolling bearing, and the first inner annular axial ridge protruding axially from the periphery of the third annular radial surface portion.

6. The axle box according to claim 1, wherein the axial gap between the first inner annular axial ridge and the outer bearing ring of the rolling bearing is less than or equal to 2 mm.

7. An axle box for a railway vehicle bogie having a rolling bearing providing an outer ring element, an inner ring element, rolling elements mounted there between, and a seal element, the inner ring element being adapted to be secured by screw bolts to an axial end of bogie axle, the axle box comprising:
an end cap having a flange with an inner face and an outer face, a first annular radial surface portion of the inner face being so defined that the first annular radial surface portion is able to lean against an axial end of the inner bearing ring element of the rolling bearing, wherein
the flange provides a central part traversed by screw bores, wherein
the flange has a first inner annular axial ridge running alongside the outer circumference of the cap, extending towards the rolling bearing all around the flange, axially at least as far as the first radial surface portion extends, so as to leave an axial gap between the first inner axial ridge and the outer bearing ring of the rolling bearing, the gap is less than or equal to 5 mm, and
a second annular axial inner ridge that extends along the inner circumference of the first annular radial surface portion, an inner circumference of the second annular axial inner ridge having a diameter equal to the outer diameter of an axial end of the axle.

8. The axle box according to claim 7, wherein the second annular axial inner ridge is inserted between the axle and the inner bearing ring, into a circumferential groove of the ring.

9. An end cap assembled to an axle box, the axle box having a rolling bearing providing an outer ring element, an inner ring element, rolling elements mounted there between, and a seal element, the seal element directly contacting the inner ring element, the inner ring element having an outer axially extending surface oriented to face the outer ring element, the inner ring element being adapted to be secured by screw bolts to an axial end of bogie axle, the end cap comprising:

a flange with an inner face and an outer face, a first annular radial surface portion of the inner face so defined that the first annular radial surface portion is able to lean against an outer face of an inner bearing ring of a bogie, wherein the flange having a central part circled by the first annular radial surface portion and traversed by screw bores, and wherein the flange providing a first inner annular axial ridge running alongside the outer circumference of the cap, extending all around the flange, axially at least as far as the first annular radial surface portion, so as to leave an axial gap between the first inner annular axial ridge and the outer bearing ring of the rolling bearing, and the gap is less than or equal to 5 mm, the end cap does not contact the seal element and does not contact the outer axially extending radial surface of the inner ring element.

10. The end cap according to claim 9, wherein the axial gap between the first inner annular axial ridge and the outer bearing ring of the rolling bearing is less than or equal to 2 mm.

11. An end cap designed to be screwed to an axle box, the axle box having a rolling bearing including an outer ring element, an inner ring element, rolling elements mounted there between, and a seal element, the inner ring element being adapted to be secured by screw bolts to an axial end of bogie axle, the end cap comprising:

a flange with an inner face and an outer face, an annular first radial surface portion of the inner face being so defined that the annular first radial surface portion is able to lean against an axial end of an inner bearing ring of the axle box, wherein the flange provides an inner second radial surface portion circled by the annular first radial surface portion and traversed by screw bores, the inner second radial surface portion being axially set back from the first annular surface portion, wherein the flange includes a rim part around the first annular surface portion, the rim part having a third radial annular surface portion on the inner face of the flange, wherein the third radial annular surface portion being also set back axially from the first annular surface portion, and wherein the rim part has an inner annular axial ridge running alongside the outer circumference of the flange, and extending from the third radial annular surface portion, all around the flange, axially to at least as far as the first radial surface portion, so as to leave an axial gap between the first inner ridge and the outer bearing ring of the rolling bearing, and the gap is less than or equal to 5 mm.

12. The end cap according to claim 11, wherein the axial gap between the first inner annular axial ridge and the outer bearing ring of the rolling bearing is less than or equal to 2 mm.

* * * * *